Dec. 2, 1958   J. W. F. FARR ET AL   2,862,243
PROCESS FOR FORMING GRANULES OF THERMOPLASTIC
POLYMERIC MATERIALS
Filed Aug. 27, 1954
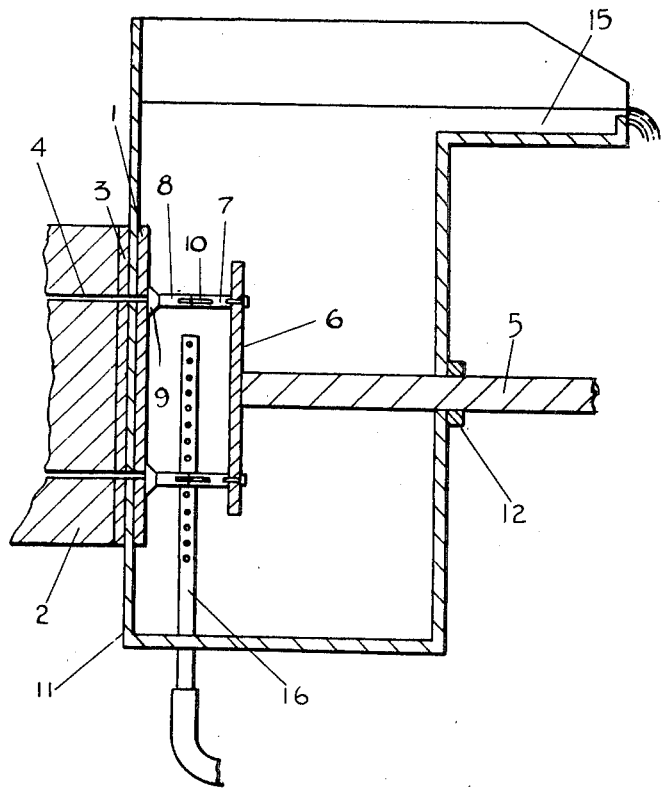
INVENTORS
JOHN WILLIAM FREDERICK FARR
WILLIAM SURMAN GILMOUR
ALEXANDER KENNAWAY
BY Cushman, Darby & Cushman
ATTORNEYS

United States Patent Office 2,862,243
Patented Dec. 2, 1958

2,862,243

PROCESS FOR FORMING GRANULES OF THERMOPLASTIC POLYMERIC MATERIALS

John William Frederick Farr, Luton, William Surman Gilmour, Welwyn, and Alexander Kennaway, London, England, assignors to Imperial Chemical Industries Limited, London, England, a corporation of Great Britain Application August 27, 1954, Serial No. 452,635

Claims priority, application Great Britain September 1, 1953

10 Claims. (Cl. 18—47.5)

This invention relates to the conversion of thermoplastic polymeric materials to a granual form, and particularly relates to an improved process for converting such materials into a granular form particularly suitable for extrusion or for injection or compression moulding.

It is desirable that thermoplastic polymers to be used for extrusion or for injection or compression moulding be obtained in the form of free-flowing granules of substantially uniform particle size; extrusion processes of all types can be worked with greater efficiency with such material than with material in any other form, and such a form facilitates uniform supply and melting of the polymer in moulding apparatus.

It is an object of the present invention to provide a process for converting thermoplastic polymeric materials into a granular, free-flowing form particularly suitable for extrusion and for injection or compression moulding. Another object is to provide such a process by which granules of uniform size may be produced. It is a further object to produce new free-flowing granules of polythene, the normally solid polymers of ethylene.

In accordance with the present invention, a process for converting a thermoplastic polymeric material into granular form comprises extruding the material in the molten state in the form of a thread or rod preferably having a cross-section of circular, elliptical or like rounded shape, directly from the extrusion orifice into a body of a cooling liquid, and cutting the thread or rod transversely into fragments while it is immersed in the liquid and before it has cooled throughout to the solid state.

By this process granules are produced which have convex substantially spherical surfaces, tending in some cases towards the form of a hemisphere, at their cut ends. The granules may thus vary in shape, ranging from curved-faced discs through substantially spherical shapes to elongated pellets of round-ended cylindrical shape, according to the frequency of cutting, the rate and temperature of extrusion and the diameter of the extruded threads or rods. A particularly free-flowing granular material is formed when the granules are of substantially spherical shape.

Whilst the process of this invention is of general applicability for the production from thermoplastic materials of free-flowing granules having the shapes described, polythene (the normally solid polymers of ethylene) has not previously been provided in the form of granules of such shapes. It is a further aspect of our invention that we have found that granules of polythene when having such shapes, and particularly when substantially spherical, are outstandingly easily handled and easily fed to extrusion or moulding equipment.

It is preferred that the extruded thread or rod be cut transversely immediately against the extrusion orifice. It is also preferred that a plurality of threads or rods be extruded simultaneously through a die having a plurality of rounded orifices.

Because the extrusion orifices communicate directly with the cooling liquid in the process of this invention, it is necessary to ensure that the liquid does not chill the extruder and the thermoplastic material before extrusion enough to prevent the material from being extruded at an economic rate. When the rate of extrusion is particularly high and the material is extruded at a temperature well above its softening temperature it may not be necessary to take any steps to prevent the liquid from chilling the extruder. Usually, however, it is desirable to insulate the extruder from the liquid; this may be done by facing the extruder with a layer of an insulating material, through which the orifices pass, but it is preferable to provide a hard metal plate, with suitable orifices, to cover the face of the extruder, and to insulate this from the extruder by means of a gasket of insulating material. The latter method provides a hard working surface against which the knives may operate. Suitable insulating materials include asbestos and polytetrafluoroethylene.

A convenient form of apparatus for operating the process of this invention is shown diagrammatically and in section in the accompanying drawing.

In this drawing, 1 is a wear plate which is screwed by countersunk screws to the face of an extrusion die 2, through one wall of a container 11 for the cooling liquid, and through an asbestos gasket 3, which insulates the die from the wear plate. 4 is one of a ring of rod-forming extrusion channels which pass from the die through the asbestos gasket, the container wall and the wear plate, and 5 is a rotatable shaft carrying a cutter assembly. This cutter assembly consists of a circular plate 6, fixed to the end of the shaft and bored to receive a number of equally spaced, fixed projecting members 7; on each of these projecting members is mounted, by a pivot, a carrying member 8 for a knife 9. The shaft 5 and the attached cutter assembly can be moved towards and away from the wear plate 1, and by this means the knives may be brought into operation against the plate; they are pressed against the plate by leaf spring 10, acting from the fixed projecting members 7 through the knife carrying member 8. The cutting edge of each knife is suitably set at an angle of about 30° to 60° to the radius of the extrusion holes at the point of cutting, depending upon the radius of the holes and the conditions of extrusion. The shaft of the cutter assembly passes through the container wall opposite to the wear plate at the gland 12.

Water or other liquid is passed into the bath through the inlet 16 which is placed to one side of the cutter and is bored to direct the incoming liquid towards the freshly extruded material. The liquid containing the cut granules of thermoplastic material flows along the outlet 15 on to a screen which collects the granules and on which they may be dried. The liquid, which drains off through the screen, may then be recirculated.

In operation, the thermoplastic material is extruded through the circular rod-forming orifices into the continuously flowing cooling liquid, and the shaft, which has previously been set so that the knives are in their cutting position, is set in rotation. The speed of rotation of the cutter is adjusted, in accordance with the output of the extruder, to give granules of the desired length. The cut granules are flung away from the face of the die by the knives, and if they are lighter than the cooling liquid, as in the case of polythene granules cooled by water, they rise to the surface of the tank and are drawn off through the outlet. In other cases an outlet may be provided at the bottom of the bath for removal of the granules and cooling liquid. The positions of the inlet for the liquid and the outlet for the liquid with the granules may be arranged so that currents of the liquid assist in removing the granules from the region of the cutter as soon as they have been formed.

Various modifications may be made to the process and apparatus illustrated by the accompanying drawing. For example, instead of horizontal extrusion as shown, the thermoplastic material may be extruded vertically upwards or downwards, or at any other convenient angle; an advantage of extruding vertically upwards is that it eliminates the need to provide a leak-proof valve between the cooling bath and the cutter drive. Other modifications that may be made include the use of an oscillating cutter instead of the rotating cutter shown in the drawing; the use of a die, gasket and wear plate having two or more rings of extrusion holes; or the use of a heat-insulating material other than asbestos, for example, polytetrafluoroethylene, for the gasket. The extrusion orifices may if desired be square, rectangular, triangular or of polygonal shape, although for ease of operation and to produce particularly free-flowing granules it is preferred that they be of rounded shape.

The efficiency of the process of this invention may be increased if the cooling liquid is maintained at an elevated temperature. Thus, by maintaining the liquid at a raised temperature which is however below its boiling point and below the temperature at which the cut granules stick together, the back pressure at the die is reduced and the output of the extruder is consequently increased. The use of warm liquid is particularly advantageous in the production of granules of small diameter, especially when the polymeric material is one that gives viscous melt; in such cases a very high extrusion pressure may be needed to extrude the material into cold liquid at an economic rate.

The most economical and most easily used cooling liquid is water, which must be at a temperature below 100° C.; therefore, the improvement achieved by using the cooling liquid at a raised temperature is greatest in the production of granules from thermoplastic materials that have a high melt viscosity and a relatively low melting point. The temperature gradient between the die and molten material, and the water is in such cases very significantly reduced, and this results in a substantial decrease in viscocity and corresponding increase in the ease of extrusion. For example, in the production of polythene granules the output of the extruder may be susbstantially increased if the temperature of the cooling water is raised to 40° C. or above; in this case, however, the temperature is preferably not raised above 65° C. or the cut pellets tend to stick together. The optimum temperature within this range depends upon the temperature of extrusion, lower cooling temperatures within the range generally being used for higher temperatures of extrusion.

When it is desired to extrude the thermoplastic material into a liquid at a temperature above room temperature, and the liquid is continuously circulated, it is usually necessary to supply heat from an external source only at the beginning of the process. The reason for this is that as the extrusion operation proceeds, the heat given up by the granules is usually sufficient to maintain the temperature of the liquid at the required level, once this temperature has been reached. Indeed, it is sometimes necessary to provide a cooling coil to prevent overheating of the liquid as the process continues; alternatively, if the liquid is water, a suitable amount of cold water may be added continuously to the cooling bath, and a corresponding amount of the hot water continuously removed. It is of course normally necessary to add some liquid during the process to replace liquid lost by evaporation in drying the pellets.

The cooling liquid may, if desired, contain surface active agents to increase the efficiency of drying or to reduce the tendency of the granules, and articles prepared therefrom, to accumulate electrostatic charges.

The screen used to separate the granules from the liquid is preferably vibrated to cause the granules to move continuously along it. Warmed air may be blown over the graules, if necessary, to dry them while they are on the screen. It is preferred, however, that the time of immersion of the granules in the coolant be kept to a minimum, being sufficient only to chill the granules enough to prevent them from sticking to each other; the residual internal heat of the granules is then usually sufficient to dry off the colant adhering to their surfaces after they have been removed from the main body of liquid without any external heat being supplied.

In the case of polythene and other materials that have a specific gravity less than unity, the cooling liquid, even when it is water, may be in a container of appreciable depth and used as an elevator so that the granules are received on the screen at a convenient height for packing. In such a case it is particularly preferred to keep the water as hot as is consisent with adequate cooling during the time of immersion of the granules. The granules may be dried, if necessary, by conventional means after they have been drained on a screen.

The screen may be in the form of a continuous non-vibratory moving belt; such a screen provides a useful means for extracting the granules from the cooling liquid, but dries them less efficiently than a vibratory screen.

By the process of the present invention, granules may be produced which are of compact shape in section transverse to the direction of extrusion, and free from longitudinal ridges and corners in the direction of extrusion, as well as having convex, substantially spherical surfaces at their cut ends, which tend towards the form of a hemisphere while they are in contact in the molten or semi-solid state with the cooling liquid. The polymer granules produced by the process are for this reason more free-flowing and more compact than those produced by methods previously known for shaping thermoplastic polymeric materials. The process may be used for the production of granules of any thermoplastic polymer, for example polythene, vinyl polymers such as polyvinyl chloride, and methacrylate polymers. It is particularly effective when used for the production of polythene granules, because as a result of the high thermal contraction of this polymer the freshly cut ends of the extruded rods or threads, being softer than the surfaces that have already contacted the cooling liquid and become somewhat contracted, are pushed out to a small extent by the molten material at the centre of the granule; thus, the tendency for these ends to assume the shape of a hemisphere is increased, and a particularly free-flowing and compact granular material is produced. The tendency for the granules to assume spherical shape is also increased if the polythene is extruded at temperatures well above its melting point, at which temperatures the melt is much less viscous. For this reason, and also to increase the output of the extruder, the extrusion temperature used for polythene is preferably at least 160° C.; it preferably does not exceed 250° C. because of the risk of decomposition.

The process of this invention has further advantages over the processes hitherto used for the production of cut granules of polymeric materials. For example, in processes in which a plurality of threads or ribbons are extruded, cooled and then cut, measures must be taken to prevent the threads or ribbons from touching each other and sticking together while they are in the molten state. In the process of the present invention this difficulty is eliminated because the threads are cut immediately on leaving the die orifices. The process can also be operated more economically and in a smaller space than processes used hitherto, and it results in the production of granules of uniform size and free from the "longs" and "fines" that generally result from cutting processes.

The process may be used to convert thermoplastic polymers in any form to the granular form. For example, the polymer may be received in the molten condition directly from the vessel in which it has been formed; it may be in the form of a fine powder; or it may be in the form of a plastic mass after compounding or homogenising in a Banbury or similar mixer, or of a cut or broken sheet. The material may if desired be homogenised or compounded in the extruder during the operation of the process of the invention; in this case the polymer may be supplied in the molten state direct from manufacture, or as a coarse mixture of polymer fragments, together with compounding agents such as colouring materials, antioxidants or fillers.

While the granules produced by the process of this invention have been described with reference to their use in extrusion and moulding processes, it will be appreciated that their uses extend to any process for which a thermoplastic material is needed in granular form. The granules are compact and uniform, and they can readily be produced in particle sizes suited to the size of the product and the nature of the operation for which they are to be used.

Our invention is illustrated but in no way limited by the following examples.

*Example I*

Polythene having an average molecular of 18,000 was extruded by means of a screw extruder having a 3.5 inch diameter, two start screws, through the die of a die and cutter assembly as shown in the accompanying drawing. The die, gasket, cooling bath wall and wear plate had 9 orifices of 3/16 inch diameter; the gasket was of asbestos and the wear plate of the case hardened, chromised steel. The output of the extruder was 220 lbs. per hour, the die temperature was 170° C., and the cooling tank was filled with flowing water at 15° C. The cutter, which had four blades, was rotated at a rate of 330 R. P. M. The polythene granules cut at the die face were carried by the water to an inclined vibrating screen, through which most of the water drained away. The rest of the water was evaporated from the granules by their residual internal heat; this drying was assisted by bouncing the granules up on the screen as well as propelling them forward along it. The granules were conveyed from the end of the screen, but hot air, to a collecting hopper. The dried, rounded granules were 0.25 inch long and 0.25 inch in diameter, were smooth and glossy and free from rough edges, and formed a free-flowing granular material.

*Example II*

A plasticized polyvinyl chloride composition (100 parts of polyvinyl chloride and 50 parts of dibutyl phthalate, by weight) was extruded by means of the extruder used in example I through the die of a die and cutter assembly of apparatus as shown in the accompanying drawing, except that the liquid and cut granules were withdrawn from the cooling tank at a controlled rate through an outlet at the bottom of the tank. The die, gasket, cooling bath wall and wear plate had 36 orifices, 0.1 inch in diameter, arranged in a single ring. The output of the extruder was 100 lbs./hour, the die temperature was 180° C., and the cooling tank contained circulating water maintained at a temperature of 50° C. A six-bladed cutter was used, rotating at a rate of 200 R. P. M. Smooth-surfaced, uniform pellets approximating to spheres were obtained.

We claim:

1. In a process for converting thermoplastic material in granules by extruding said material in molten condition as a thread or rod directly from an extrusion orifice into a body of cooling liquid and cutting the extruded material into granules while said extruded material is immersed in said cooling liquid and before it has cooled throughout to the solid state, the improvement which comprises extruding said material through a plurality of die orifices, said orifices lying in the same plane around an axis parallel to the direction of extrusion, transversely cutting said extruded material with rotary cutter means rotating about said axis, and asymmetrically and continuously introducing a supply of the cooling liquid to the region of said rotating cutter means in a direction substantially transverse to said axis of extrusion, thereby aiding the centrifugal action of said rotating cutter means in removing the cut extruded particles from the region of said orifices, and withdrawing the liquid and entrained granules driven outwardly by said cutter means.

2. A process according to claim 1 in which said cooling liquid is maintained at a temperature above room temperature but below the boiling point of the liquid and below the temperature at which the granules stick together.

3. A process according to claim 1 in which said thread or rod is cut immediately against the extrusion orifice.

4. A process according to claim 1 in which the granules are afterwards separated from the liquid by means of a vibratory screen.

5. A process according to claim 1 in which the granules are afterwards separated from the bulk of the cooling liquid while they still have sufficient internal heat to assist in evaporating the liquid adhering to their surfaces.

6. A process according to claim 1 in which the rate of cutting the thermoplastic thread or rod is so adjusted in accordance with the diameter of the thread or rod as to form granules of substantially spherical shape.

7. A process according to claim 1 in which the thermoplastic polymeric material is polythene.

8. A process according to claim 7 in which the polythene is extruded at a temperature of from 160° to 250° C.

9. A process according to claim 1 in which the cooling liquid is water at a temperature of from 40° to 65° C.

10. A process according to claim 1 in which the thermoplastic polymeric material is polyvinyl chloride.

References Cited in the file of this patent

UNITED STATES PATENTS

| | | |
|---|---|---|
| 1,480,969 | Thomson | Jan. 15, 1924 |
| 2,021,837 | Davidson | Nov. 19, 1935 |
| 2,299,929 | Raynolds | Oct. 27, 1942 |
| 2,343,829 | Clayton | Mar. 7, 1944 |
| 2,473,588 | Johnson | June 21, 1949 |